US008824522B2

(12) United States Patent
Schad et al.

(10) Patent No.: US 8,824,522 B2
(45) Date of Patent: Sep. 2, 2014

(54) PUMP LIGHT ASSEMBLY FOR A DISC LASER

(75) Inventors: Sven Schad, Rottweil (DE); Alexander Killi, Trossingen (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 13/985,636

(22) PCT Filed: Feb. 9, 2012

(86) PCT No.: PCT/EP2012/052172
§ 371 (c)(1),
(2), (4) Date: Sep. 27, 2013

(87) PCT Pub. No.: WO2012/110389
PCT Pub. Date: Aug. 23, 2012

(65) Prior Publication Data
US 2014/0016662 A1    Jan. 16, 2014

(30) Foreign Application Priority Data

Feb. 16, 2011   (DE) .................. 10 2011 004 204

(51) Int. Cl.
*H01S 3/091*   (2006.01)
*H01S 3/094*   (2006.01)
*H01S 3/06*    (2006.01)
*H01S 3/00*    (2006.01)

(52) U.S. Cl.
CPC .............. *H01S 3/094* (2013.01); *H01S 3/0604* (2013.01); *H01S 3/0621* (2013.01); *H01S 3/094084* (2013.01); *H01S 3/005* (2013.01)
USPC .............................................. 372/70; 372/67

(58) Field of Classification Search
USPC ..................................... 372/70, 67
See application file for complete search history.

(56) References Cited

U.S. PATENT DOCUMENTS

| 4,247,772 A | 1/1981 | Lavelle et al. |
| 6,577,666 B2 * | 6/2003 | Erhard et al. .................. 372/70 |

(Continued)

FOREIGN PATENT DOCUMENTS

| DE | 19835107 A1 | 2/2000 |
| DE | 10005195 A1 | 8/2001 |

(Continued)

OTHER PUBLICATIONS

Yang S et al: "Multipass Ti:sapphire amplifier based on a parabolic mirror", Optics Communications, North-Holland Publishing Co. Amsterdam, NL, vol. 234, No. 1-6, Apr. 15, 2004, pp. 385-390, XP004499705, ISSN:0030-4018, DOI: 10.1016/J. OPTCOM. 2004. 02.034 p. 386, left-hand column, pargraph 2, p. 389, right-hand column; figures 1,2.

(Continued)

*Primary Examiner* — Kinam Park
(74) *Attorney, Agent, or Firm* — Michael D. Bednarek; Axinn Veltrop & Harkrider LLP

(57) ABSTRACT

A pump light assembly (6) for a disc laser (1), comprising: a focusing device, in particular a concave mirror (11), having a reflecting surface (10) for focusing a pump light beam (8) onto a laser-active medium (2), and a deflecting assembly for deflecting the pump light beam (8) between reflecting regions formed on the reflecting surface (10) and disposed in different angular regions about a central axis (12) of the reflecting surface (10). The deflecting device is configured to produce a deflection of the pump light beam (8) between in each case two of the reflecting regions with an optical path length (2 f+2 d1; 2 f+2 d2) that is greater than the optical path length (2f) in the case of telecentric imaging in order to compensate for a beam expansion of the pump light beam (8), caused by aberrations of the focusing device (11), in successive focusings onto the laser-active medium (2). The invention also relates to a disc laser (1) and to a method for pumping a laser-active medium (2).

22 Claims, 4 Drawing Sheets

(56) References Cited

U.S. PATENT DOCUMENTS

| | | | |
|---|---|---|---|
| 6,891,874 B2* | 5/2005 | Erhard et al. | 372/64 |
| 8,477,825 B2* | 7/2013 | Hertwig et al. | 372/99 |
| 2003/0025987 A1* | 2/2003 | Erhard et al. | 359/333 |

FOREIGN PATENT DOCUMENTS

| | | |
|---|---|---|
| EP | 0632551 B1 | 1/1995 |
| EP | 1252687 | 8/2001 |
| WO | 2011163140 A1 | 12/2011 |

OTHER PUBLICATIONS

Najafi M et al: "Simulation of thin disk laser pumping process for temperature dependent Yb:YAG property", Optics Communications, North-Holland Publishing Co. Amsterdam, NL, vol. 282, No. 20, Oct. 15, 2009, pp. 4103-4108, XP026525402, ISSN: 0030-4018, DOI: 10.1016/J.OPTCOM.2009.06.068 [retrieved on Jul. 16, 2009] p. 4103, left-hand column—p. 4104, right-hand column; figures 1,2; table 1.

Erhard S.: "Pumpoptiken und Resonatoren für den Scheibenlaser", Munich, Herbert Utz Verlag, 2002. pp. 40-50, ISBN 3-8316-0173-9.

Stewen, C.: "Scheibenlaser mit Kilowatt-Dauerstrichleistung", University Stuttgart, 2002, ISBN 3-89675-763, pp. 1-146.

German Office Action dated Jun. 8, 2011.

International Search Report & Written Opinion dated May 18, 2012.

International Preliminary Report on Patentability and Written Opinion of the International Searching Authority dated Aug. 29, 2013.

* cited by examiner

PUMP LIGHT ASSEMBLY FOR A DISC LASER

This application is a national stage application of International Application No. PCT/EP2012/052172 (WO 2012/110389 A1), filed Feb. 9, 2012 which is herein incorporated by reference in its entirety.

BACKGROUND OF THE INVENTION

1. Field of the Invention

The present invention relates to a pump light assembly for a disc laser, comprising: a focusing device, in particular a concave mirror, having a reflecting surface for focusing a pump light beam onto a laser-active medium, and a deflecting assembly for deflecting the pump light beam between a plurality of reflecting regions formed on the reflecting surface and disposed in different angular regions about the central axis of the reflecting surface. The invention also relates to a disc laser having such a pump light assembly, and to a method for pumping a laser-active medium, comprising: repeatedly focusing a pump light beam onto the laser-active medium by means of a focusing device, in particular a concave mirror wherein between successive focusing steps a deflection of the pump light beam between different reflecting regions of a reflecting surface of the focusing device which are disposed in different angles about the central axis of the reflecting surface is taking place.

Disc lasers have a laser-active medium (amplifier medium) of low thickness (laser disc) that can be cooled well. The concept of the disc laser is therefore suitable for high laser powers in the multi-kilowatt range. Owing to the low thickness of the amplifier medium, however, little pump radiation is absorbed during a pass through the laser-active medium and, without the provision of suitable measures in the pumping of the laser-active medium, this results in a low efficiency of the laser system. To obtain a minimum energy or minimum laser power required to fulfill the laser condition in the laser-active medium, a multiple pass by the pump radiation is generally required.

That multiple pass may be accomplished, for example, in the manner described in EP 0 632 551 B1. Therein, a pump light beam is radiated in at an angle to the top side of the disc-shaped laser-active medium and is reflected at a reflecting surface provided at the rear side of the laser-active medium. The reflected pump light beam is subsequently reflected back onto the laser-active medium repeatedly via a plurality of pump light mirrors and auxiliary mirrors. For the deflection, spherical mirrors are used and a direct 1:1 image of the pump spot is produced in two successive focusing steps. However, the pump beam diverges with every imaging operation, with the result that the size of the pump spot increases and hence the power injected into the laser-active medium decreases, which limits the number of the multiple passes.

2. Description of Related Art

The pump assembly described in EP 1 252 687 B1 is intended to solve that problem, see also "Pumpoptiken and Resonatoren für Scheibenlaser" (pumping optics and resonators for disc lasers), S. Erhard, Dissertation, University Stuttgart, 2002, ISBN 3-8316-0173-9. Therein, the pump light beam is focused onto the laser-active medium with the aid of a parabolic mirror, the multiple pass being achieved by means of the pump light beam being repeatedly deflected with the aid of deflecting means, for example prisms, between different reflecting regions lying in different sectors in one and the same ring region of the parabolic mirror. Since the parabolic mirror collimates the divergent pump light beam emerging from the laser-active medium which is disposed in the focal plane of the parabolic mirror, the divergence of the pump radiation field to be focused is partially compensated for during the multiple pass, with the result that a higher pump power density can be produced in the laser-active medium.

The deflection of the pump radiation between different sectors of the parabolic mirror does, however, mean that, as the number of passes increases, the utilization of the reflecting surface formed on the parabolic mirror decreases, that is to say, increasingly smaller angular regions (sectors) with increasingly smaller reflecting regions are required for reflection of the pump radiation. The consequence of this is that an increase in the efficiency of the pump light assembly, which becomes necessary at high laser powers, can be achieved only by a higher beam quality or a smaller beam parameter product of the pump light.

In "Scheibenlaser mit Kilowatt-Dauerstrichleistung" (disc lasers with kilowatt continuous-wave power), C. Stewen, Dissertation, Universitat Stuttgart, 2002, ISBN 3-89675-763, it is proposed that, using a plurality of deflecting units, also a plurality of ring regions with reflecting regions on the parabolic mirror be utilized for imaging, the individual rings being disposed radially in a segment of the parabolic mirror. The imaging of the pump light spot typically takes place in this case with telecentric imaging.

The greater the number of deflections of the pump light beam, the greater becomes the effect of divergence, which cannot be compensated for by the use of the parabolic mirror. This leads to a noticeable enlargement of the pump spot or of the collimated bundle of rays between the parabolic mirror and the deflecting devices, so that, even in the case of such a pump light assembly, the number of multiple passes and hence the level of the pump power density in the laser-active medium is limited.

The dissertation of S. Erhard also proposes using a telecentric imaging for the production of multiple passes in which the distance between the two lenses used for the imaging corresponds to the sum of their focal lengths. In real systems a (possibly undesired) curvature of the surface of the pumped laser disc and/or a thermal lens occurs which lead(s) to a resulting total focal length $f_{ges}$ that, despite the arrangement of the lenses at the distance of the sum of the focal lengths (2 f), leads to an expansion of the beam in the imaging. In the dissertation, it is proposed that that effect be compensated for by introducing a small deviation δ of the distance of the lenses of double the focal length, which is selected in such a way ($\delta = f^2/f_{ges}$) that the overall system makes telecentric imaging possible.

However, in a laser system, owing to the focusing device, aberrations occur which add up with every pass. Those aberrations therefore limit the number of multiple passes and hence the level of the pump power density in the active medium. Those aberrations cannot be described with an additional lens and were not considered in the dissertation.

SUMMARY OF THE INVENTION

An object of the present invention is to provide a pump light assembly, a disc laser and associated pumping method which allow for an increased number of pump light passes through a laser-active medium.

That object is attained according to an embodiment of the invention by a pump light assembly of the kind mentioned in the introduction, in which the deflecting device is configured to produce a deflection of the pump light beam between in each case two of the reflecting regions with an optical path length that is greater than the optical path length in the case of telecentric imaging, which in an ideal imaging system corresponds to double the focal length of the focusing device, in order to prevent beam expansion of the pump light beam, caused by aberrations of the focusing device, in successive focusings onto the laser-active medium.

The inventors have realized that, even in the case of telecentric imaging, in which the optical path length in the deflection between two of the reflecting regions corresponds exactly (in an ideal imaging system) to double the focal length of the focusing device, the pump light beam will expand in successive focusing steps. One important reason for this is the (unavoidable) aberrations of the focusing device (the concave or parabolic mirror) which mean that, even in the case of (nominally) telecentric imaging with finite expansion of the diameter of the pump light beam emerging from the pump light source the far field (that is, the pump light beam between two reflecting regions) becomes larger from pass to pass.

In the case of the customarily used dimensions of pump light assemblies, the additional optical path length required to be able to effectively compensate for the increase in the divergence is typically more than about ⅙ or more than about a quarter, particularly preferably more than half, of the focal length of the concave or parabolic mirror. Typically, the required additional optical path length is not greater than the focal length of the parabolic mirror. In addition to depending on the focal length f of the concave mirror, the numerical values for the additional optical path length typically also depend on the diameter D of the concave mirror or of the reflecting surface. For the exact magnitude of the additional optical path length required for effective compensation for the beam expansion it is not possible to state an analytical formula, but the exact magnitude can be determined for a pump light assembly with predefined parameters by simulation calculations (for example ray-tracing).

By a selective deviation from the optical path length in the case of telecentric imaging, the expansion of the pump light beam can be very largely prevented. By virtue of that configuration there is also obtained in the near field, that is, in the imaging plane, a desirably blurred image which results in a reduction in the phase disturbances occurring at the edge of the pump spot, and this also has a positive effect on the efficiency of the laser resonator or the pump light assembly. In real imaging systems, owing to a curvature or thermal lens which may possibly occur in the laser-active medium, the optical path length required for the telecentric imaging does not correspond exactly to double the focal length of the focusing device. Those effects, which are caused by the laser-active medium, can if necessary be additionally taken into consideration and compensated for by also taking into consideration the deviation ($\delta=f^2/f_{ges}$) from double the focal length required to produce a telecentric image when determining the optical path length of the telecentric imaging. That deviation ($\delta=f^2/f_{ges}$) is, however, distinctly smaller than the additional optical path length that is needed to compensate for the aberrations of the focusing device.

Since by means of the measures described above it is possible to increase the number of multiple passes, it is advantageous to carry out a radial deflection of the pump light beam in addition to the azimuthal deflection of the pump light beam in order to arrive at as high as possible a pump power density in the laser-active medium.

For that purpose, the deflecting assembly can be configured for deflection of the pump light beam between reflecting regions disposed at different distances from the central axis of the reflecting surface. In that manner, the reflecting surface of the focusing device can be optimally utilized even in the case of a large number of multiple passes. As explained in the foregoing, by contrast, for a predefined surface of the parabolic mirror or a predefined diameter of the reflecting surface, in the case of exclusively azimuthal deflection and an increasing number of passes the cross-section of the (collimated) pump light beam would have to be reduced and hence the beam quality of the pump light would have to be increased.

The diameter of the reflecting surface could admittedly be increased even in the case of exclusively azimuthal deflection, and therefore the reduction in the cross-section of the pump light beam could possibly be dispensed with; however, the maximum diameter of a concave mirror, for example a parabolic concave mirror, depends on its focal length. Since, however, with the diameter of the parabolic mirror staying the same and with decreasing focal length the coma aberration of the mirror increases, the focal length is limited by the aberrations. It would be desirable, however, to utilize the full half space, that is, a solid angle of nearly 2 π. In addition, a reduction in the focal length leads, for example, to the installation space between the parabolic mirror and the laser-active medium becoming smaller and possibly not being sufficient for accommodating the deflecting assembly or individual deflecting devices.

In one embodiment, the optical path length of the pump light beam in the deflection between in each case two of the reflecting regions is selected in such a manner that the power of the pump light beam injected into the laser-active medium is maximized. The inventors have discovered that the power injected into the laser-active medium by the pump light assembly, that is to say, the effectiveness of the pump light assembly, depends to a significant degree on the selected optical path length in the deflection between the reflecting regions. It has been found that a pronounced maximum of the injected power is reached at an optical path length that markedly deviates from the range of telecentric imaging, that is, double the focal length of the focusing device in the deflection between two reflecting regions. That maximum is typically (but not compulsorily) reached at an additional optical path length that is within an interval of between about one quarter of the focal length and the total focal length of the focusing device. In particular, it is advantageous if the additional optical path length is at least half the focal length of the focusing device.

In a further embodiment, the deflecting assembly is configured for deflection of the pump light beam between in each case two of the reflecting regions disposed at the same distance from the central axis of the reflecting surface with the same optical path length. Particularly when prisms are provided for the deflection, it has proved advantageous to carry out all deflections that are carried out between in each case two of the reflecting regions disposed at the same distance from the central axis with the same optical path length since in that case the prisms or pairs of prisms can be arranged in a common plane, which simplifies the handling thereof. It will be appreciated, however, that it is not compulsory for individual prisms or pairs of prisms to be arranged at the same (optimized) distance. Particularly when one pair of prisms is arranged closer to and in return another pair of prisms is arranged further away from the parabolic mirror, this does not necessarily have to lead to appreciable impairment of the imaging quality. However, a small distance of the prisms or pairs of prisms from the parabolic mirror may possibly lead to clipping losses, and to compensate for those clipping losses the focal length of the parabolic mirror would have to be increased, which would entail a reduction in the size of the effectively used solid angle.

In the case of the pump light assembly according to the invention, the pump light beam emerging from a pump light source impinges on the reflecting surface, for example in the form of a paraboloid, typically in collimated form and with a circular beam cross-section, parallel to the central axis. The reflecting regions are therefore formed in a circular shape in a projection onto a plane perpendicular to the central axis. Wherever circular reflecting regions or a circular reflecting surface is mentioned hereinafter, this refers in each case to the projection into a plane perpendicular to the central axis.

In one embodiment, the reflecting regions are disposed in a first, inner ring region and in a second, outer ring region of the reflecting surface and, where applicable, in further ring regions. The arrangement of the reflecting regions in a plurality of concentric circular rings has proved advantageous in order that the fill factor, that is, the surface area of the reflecting surface covered by the reflecting regions, can be selected to be as large as possible. At the center of the reflecting surface there is typically no reflecting region in this case, but rather a passage opening for the laser beam produced in the pumping of the laser-active medium. The size of the reflecting regions of an individual ring region can be selected in this case in such a way that the reflecting regions are spaced from one another. To optimize utilization of the surface area, the size of the reflecting regions may also be so selected, however, that adjacent reflecting regions touch one another at a point. In principle, the individual reflecting regions are not, however, intended to overlap.

In one embodiment, the optical path length of the pump light beam in the deflection between reflecting regions in the first, inner ring region is less than the optical path length in the deflection of the pump light beam between reflecting regions in the second, outer ring region. It has been found that, in the case of the imaging described here, which is not purely telecentric, it is advantageous if the optical path length in the deflection between reflecting regions in the inner ring region is less than the optical path length in the deflection between reflecting regions in the outer ring region. With such a configuration of the pump light assembly it is to be noted that, if deflecting prisms are used as the deflecting device, deflection of the pump light beam should take place only in the azimuthal direction, that is, only between reflecting regions of one and the same ring region. The reason for this is that, in the case of a deflection in which the collimated pump light beam propagates through the center of the pump assembly, as a rule clipping losses occur due to the inner prism set. It will be appreciated, however, that when deflecting devices in the form of fiber bundles, for example, are used, as a rule deflection in the radial direction is also possible without any problem.

The deflection can be carried out, for example, with mirrors, deflecting prisms or fiber bundles. If the deflection is carried out with conventional mirrors, the optical path length corresponds to the geometric path length. On the other hand, when utilizing total reflection or when using a fiber arrangement for deflection of the pump beam, the pump light beam propagates through an optical medium whose refractive index is to be taken into account in calculating the optical path length.

If deflecting units in the form of deflecting prisms or mirrors are used, in the case of imaging that is not purely telecentric their cut edges do not lie in one plane with the laser disc or the laser-active medium, but are further away from the focusing device. In this case, the deflecting units of the outer ring region are spaced further from the plane containing the laser disc than are the deflecting units of the inner ring region.

As described above, a sharp image is not produced in this case, so as not to increase the divergence of the pump light beam.

In the deflection of the pump light beam between two reflecting regions on ring regions of a (curved) reflecting surface, for example a reflecting surface with an (approximately) parabolic curvature, that are at radially different distances from the central axis, a further problem occurs when mirrors or prisms are used for the deflection: in order to image an object (laser disc or pump spot) disposed at an angle to the optical axis with maximum sharpness, it is necessary to fulfill the so-called Scheimpflug condition, that is to say, the image plane must be rotated so that the object can be imaged into itself again. In the deflection from a reflecting region in a radially outer ring region into a reflecting region in an inner ring region (or vice versa), that condition is no longer necessarily fulfilled if a deflecting prism or a mirror is used for the deflection. That too leads to expansion of the pump light beam.

In a further embodiment, the deflecting assembly has a deflecting device for deflection of the pump light beam between a reflecting region in the first ring region and a reflecting region in the second ring region, the deflecting device comprising two mirror surfaces and imaging optics which are configured for meeting the Scheimpflug condition in the imaging of the pump light beam at the reflecting regions by the two focusing operations associated with the deflection. The imaging optics have reflective or transmissive imaging optics, for example in the form of two lenses, for extending the optical path length, which, in combination with suitably arranged (plane) mirror surfaces oriented at a suitable angle to each other and to the beam path, effect a displacement and tilting of the image plane, which is so selected that the Scheimpflug condition can be met when the pump spot is imaged onto itself in the corresponding focusing operations.

The deflecting mirrors or deflecting prisms of such a deflecting device have in this case a distance from the plane containing the laser-active medium which is typically different from that of deflecting devices that effect exclusively an azimuthal deflection within a respective ring region. Typically, the optical path length travelled by the pump light beam in the deflection between the inner and the outer ring region is greater than in the case of the azimuthal deflection within the-respective ring regions by four times the focal length (4 f). It will be appreciated, however, that it is not compulsory for a deflecting device for radial deflection to fulfill the Scheimpflug condition. For example, it is also possible to use for radial deflection a symmetrical deflecting prism whose mirror surfaces are oriented at a right angle to each other, in which case imaging optics are dispensed with.

In an advantageous development, the first ring region has a number of six reflecting regions. This has proved advantageous for obtaining as great as possible a fill factor. With such a number of (circular) reflecting regions, it is possible for all neighboring reflecting regions to be immediately adjacent to one another, so that the available surface area can be optimally utilized.

In a development, the second ring region has a number of twelve reflecting regions. Particularly when the first ring region has six (circular) reflecting regions it is possible in this case also for the (circular) reflecting surface to be optimally utilized, that is to say, with that number of reflecting regions the fill factor exhibits a (local) maximum.

In a further development, the reflecting surface has a third, radially outer ring region which preferably comprises a number of eighteen reflecting regions. In that case also, the fill factor attains a (local) maximum with such a number of reflecting regions on the reflecting surface. It will be appreciated that further ring regions may be provided where appropriate, in which case the utilization of the surface area can be maximized by suitable selection of the number of reflecting regions in the respective ring region.

In a further embodiment, the reflecting surface has an aspherical shape, preferably a parabolic shape, especially an aspherical shape that slightly deviates from the parabolic shape. A concave mirror serves as the focusing device as a rule, the concave mirror typically having an (approximately) parabolic reflecting surface in order to achieve collimation of the pump light beam reflected by the laser-active medium at the (rotationally symmetrical) reflecting surface. That function may, where appropriate, also be fulfilled by other aspherical surfaces or, where appropriate, a segmentation or faceting of the concave mirror may be carried out, each of the facets being associated with a respective one of the reflecting regions.

In one embodiment, the deflecting assembly has, especially for the azimuthal deflection (within a ring region), at least one deflecting device with two deflecting surfaces oriented mirror-symmetrically with respect to a plane of symmetry which are preferably formed on a prism or on a plurality of prisms. The deflecting device may in this case be configured as a 180° deflecting prism utilizing total reflection at the cathetus faces serving as deflecting surfaces. It is, however, also possible to use, for example, two prisms (or a biprism) with mirror-coated hypotenuse face as a 180° deflecting device. Alternatively, it is also possible, for example, to use for deflection two plane mirrors that are disposed at an angle of 90° to each other and that, where appropriate, are in contact with each other along a common edge.

As described above, instead of using deflecting devices having, in particular, deflecting surfaces that are perpendicular to each other, it is also possible to use other kinds of deflecting device, for example fiber bundles. Nor is it compulsory to carry out as described above, a 180° deflection of the pump light beam. As a general principle, however, a deflection that merely produces a deflection of the direction of the pump light beam together with a displacement of the beam, that is, a parallel shifting of the pump light beam is advantageous.

In a further embodiment, the deflecting assembly has a deflecting device for deflection of the pump light beam in the azimuthal direction between the reflecting regions of the first ring region and/or of the second ring region. Such a deflecting device serves exclusively for deflection of the pump light beam in the azimuthal direction, it also being possible for that deflecting device to be formed in such a manner that a radial deflection between reflecting regions of the first ring region and reflecting regions of the second region can also take place therewith if appropriate. It will be appreciated that it is also possible for a further deflecting device to be provided, which reflects the pump light beam back into itself and which may be formed, for example, by a plane mirror disposed in a plane perpendicular to the central axis.

In a further embodiment, the pump light assembly includes a pump light source for generating the pump light beam. The pump light source generates in this case pump light which emerges at a beam exit surface whose diameter determines the minimum diameter of the pump light beam. The pump light source also defines the divergence (or the aperture angle) of the pump light beam and therefore determines the beam parameter product of the pump light beam, which is defined as the radius of the pump light beam×0.5× the full aperture angle (in the far field).

In a development, collimation optics for collimating the pump light beam is disposed in the beam path between the pump light source and the reflecting surface. The collimated pump light beam impinges on the reflecting surface and produces there what is normally a circular reflecting region ("spot"). As described in the foregoing, radiation of a collimated pump light beam onto the reflecting surface is advantageous since, after focusing onto the laser-active medium, the beam is reflected by the laser-active medium back to the reflecting surface and is collimated by the (parabolic) reflecting surface with the result that the beam diameter is not made larger in the deflection operation.

In a further embodiment, the diameter of the pump light beam emerging from the pump light source is half as large as the diameter of the collimated pump light beam. In that manner it is possible to maximize the beam parameter product of the pump light used, as will be explained below for the case of using a parabolic mirror as a reflecting surface.

The diameter of the collimated radiation $D_{koll}$ increases with the diameter and divergence angle of the pump source. Since, however, there is only limited space available for the collimated pump radiation on the reflecting surface (parabolic mirror) and the diameter $D_{koll}$ is given by the beam parameter product BPP, the diameter of the pump radiation $D_{pump}$ and the focal length of the parabolic mirror $f_{para}$ ($D_{koll}=4\ f_{para}/D_{pump}\ BPP+D_{pump}$), this gives for the maximum beam parameter product BPPmax that a pump source can have in order to obtain the maximum possible diameter of the collimated radiation $D_{koll}$ on the parabolic mirror:

$$BPP_{MAX}=(D_{koll}-D_{pump})*D_{pump}/(4*f_{para}).$$

The focal length of the parabolic mirror $f_{para}$ may also be expressed by way of $k*D_{pump}$, where k is a constant that substantially depends on the geometric dimensions of the deflecting prisms or mirrors and of the parabolic mirror. For a predefined focal length $f_{para}$ of the parabolic mirror it is possible to differentiate with respect to $D_{pump}$ and set $BPP_{MAX}$ equal to zero in order to obtain in that manner the maximum $D_{koll}=2D_{pump}$.

A further aspect of the invention relates to a disc laser that has a laser-active medium and a pump light assembly as described above. It will be appreciated that the disc laser (or where applicable the disc laser amplifier) also has a resonator which may be formed, for example, between a mirror-coated rear side of the laser-active medium (laser disc) and an element for outputting the laser beam such as, for example, a (semitransparent) output mirror. Pump light passes repeatedly through the laser-active medium of the disc laser, it being possible to use pump light with a comparatively large beam parameter product even in the case of a multiple number of passes, with the result that the costs for providing the pump radiation are reduced. By increasing the number of multiple passes and the use of imaging that is not purely telecentric, the efficiency of the disc laser may at the same time be increased.

The invention also relates to a method for pumping a laser-active medium of the kind mentioned in the introduction, in which the deflection of the pump light beam between in each case two of the reflecting regions takes place with an optical path length that is greater than the optical path length in the case of telecentric imaging, which in an ideal imaging corresponds to double the focal length of the focusing device, in order to compensate for a beam expansion of the pump light beam, caused by aberrations of the focusing device, in successive focusings onto the laser-active medium. As described above, by means of imaging that is not purely telecentric it is possible to compensate (almost) completely for the enlargement of the pump spot on the laser-active medium in successive focusings. Where applicable, a beam expansion of the pump light beam caused by the laser-active medium can additionally be compensated for by suitably adapting the optical path length required for the telecentric imaging.

In one variant, the optical path length of the pump light beam in the deflection between in each case two of the reflecting regions is selected in such a manner that the power of the pump light beam injected into the laser-active medium (in the case of a predefined number of multiple passes) is maximized, that is, the effectiveness of the injection of the pump light is at a maximum.

In a further variant, the additional optical path length in excess of the optical path length in the case of tefecentric imaging is at least a quarter of and preferably at least half of the focal length of the focusing device (where applicable, at least one sixth of the focal length may already suffice). As explained in the foregoing, the additional optical path length that is needed to effectively compensate for the aberrations of the focusing device is comparatively large.

The additional optical path length in excess of the optical path length in the case of telecentric imaging may be determined in particular as a function of the diameter of the reflecting surface. As explained in the foregoing, the magnitude of the additional optical path length depends inter alia on the diameter of the concave mirror or the reflecting surface. Deviations from a parabolic shape of the concave mirror also lead to possibly slightly different additional optical path lengths. It is also possible, where applicable, to make a deliberate deviation from a parabolic surface shape in the local shaping of the mirror in order further to increase the aberrations and hence the number of circuits.

In a further variant, the surface of the parabolic mirror is adapted, particularly preferably in combination with one of the preceding variants. In this case, a deviation is made from the parabolic surface in order further to minimize the aberrations. In that manner, more passes can be made possible.

BRIEF DESCRIPTION OF THE DRAWINGS

Further advantages of the invention will be apparent from the description and the drawings. The features mentioned above and the features set forth hereinafter may also be used individually or a plurality thereof may be used in any desired combination. The embodiments shown and described are not to be understood as forming a definitive list, but rather are of the nature of examples for illustrating the invention.

DETAILED DESCRIPTION

Figure 1:
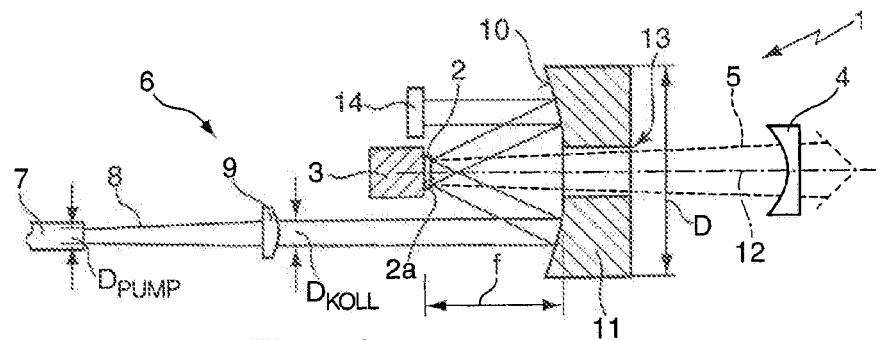
FIG. 1 is an illustration of a disc laser with a pump light assembly in accordance with the prior art.

FIG. 1 shows a disc laser 1 having a laser-active medium 2 in the form of a laser disc which is disposed for cooling purposes on a heat sink 3. On the side of the laser disc 2 facing the heat sink 3a reflective coating 2a is applied which together with a semitransparent output mirror 4 forms a resonator for laser radiation 5 which is generated by excitation of the laser active medium 2 and which leaves the resonator through the semitransparent output mirror 4, as indicated by an arrow in FIG. 1.

For excitation of the laser-active medium 2 the disc laser 1 has a pump light assembly 6 with a pump light source 7 which produces an initially divergent pump light beam 8 which is collimated at collimating optics illustrated for the sake of simplicity in the form of a single lens 9 in FIG. 1. The collimated pump light beam 8 impinges on a reflecting surface 10 formed on a concave mirror 11. The reflecting surface 10 extends rotationally symmetrically with respect to a central axis 12 of the concave mirror 11 and is curved parabolically, that is, the concave mirror 11 forms a parabolic mirror. The collimated pump light beam 8 extends parallel to the central axis 12 of the concave mirror 11. The concave mirror 11 further has a central opening 13 for the passage of the laser radiation 5 produced in the laser-active medium 2.

The collimated pump light beam 8 is reflected at the parabolic reflecting surface 10 and focused onto the laser-active medium 2 which is disposed at the focal point or in the focal plane of the concave mirror 11 (with focal length f). In the process, a beam exit surface of the pump light source 7 is imaged onto the laser-active medium 2 in the focal plane on a reproduction scale that is defined by the focal length f of the parabolic mirror 11 and the focal length (not shown) of the collimating lens 9.

The pump light beam 8 is then reflected at the reflective coating 2a at the rear side of the laser-active medium 2, impinges divergently on the reflecting surface 10 and is there reflected once more. The reflected pump light beam 8 is collimated owing to the parabolic geometry of the reflecting surface 10 and subsequently impinges on a deflecting device 14 in the form of a plane mirror disposed in a plane perpendicular to the central axis 12, and at the plane mirror is reflected back into itself.

In the pump scheme described above in connection with FIG. 1, it has not yet been described that after the first impingement on the reflecting surface 10 and before the last impingement on the reflecting surface 10, the pump light beam 8 is repeatedly deflected between reflecting regions formed on the reflecting surface 10 being disposed in different angular regions about the central axis 12. Those reflecting regions B1 to B8 may, as shown in FIG. 2, be disposed at the same distance around the central axis 12.

Figure 2:
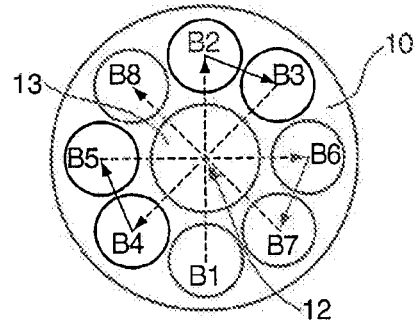
FIG. 2 is a schematic illustration of a circular reflecting surface with reflecting regions arranged in different angular regions about a central axis of the reflecting surface.

The pump light beam 8 collimated by means of the lens 9 impinges on the reflecting surface 10 at the first reflecting region B1, is initially reflected at the laser-active medium 2 and then impinges on the second reflecting region B2, as indicated by a dashed-line arrow in FIG. 2. From the second reflecting region B2 the pump light beam 8 is deflected onto a third reflecting region B3 by means of a deflecting device, not shown, for example in the form of a prism, which forms part of a deflecting assembly, also not shown. From there, the pump light beam 8 is reflected via the laser disc 2 onto a fourth reflecting region B4 and from there is deflected via a further deflecting device, not shown, to a fifth reflecting region B5 and so on, until the pump light beam reaches the eighth reflecting region B8 at which it is reflected back into itself by means of the plane mirror 14 shown in FIG. 1. For details of the deflecting device in the arrangement of the reflecting regions B1 to B8 illustrated in FIG. 2 reference is made to EP 1 252 687 B1 mentioned in the introduction, which is incorporated by reference in this application.

In the case of the reflecting surface 10 illustrated in FIG. 2, the reflecting regions B1 to B8 are disposed at the same distance from the central axis 12 and are spaced from one another. Obviously, with this type of arrangement, the available space on the reflecting surface 10 is not optimally used for reflection, that is, the fill factor, which represents the ratio of the surface area used for reflection to the total surface of the reflecting surface (in the projection shown in FIG. 2 perpendicular to the central axis 12), is comparatively small.

Figure 3:
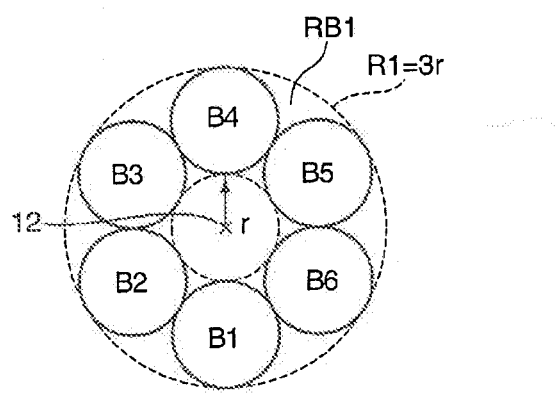
FIG. 3 is a schematic illustration of a reflecting surface with a central opening and a first ring region with six reflecting regions.

For a given radius r of the reflecting regions and a given radius R1 of the reflecting surface, the fill factor can be distinctly increased if neighboring reflecting regions are immediately adjacent to one another, as is the case with a reflecting surface 10 shown in FIG. 3. There, six reflecting regions B1 to B6 that are immediately adjacent to one another are disposed about the central opening 13. The central opening 13 has in this case the same radius r as the reflecting regions B1 to B6, so that a fill factor of $(7 \times \pi \times r^2)/(\pi(3r)^2) = 7/9$ is obtained (where R1=3r). The reflecting surfaces B1 to B6 of FIG. 3 form a first ring region RB1 which is limited towards the inside by the central opening 13 and towards the outside by the radius R1 of the reflecting surface 10.

Figure 4A:
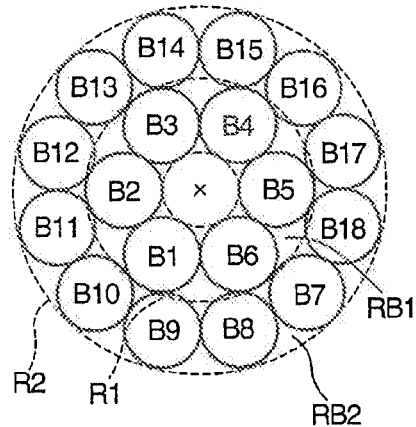
FIGS. 4a, b are illustrations of a reflecting surface with a second ring region with twelve and a third ring region with eighteen reflecting regions, respectively.
Figure 4B:
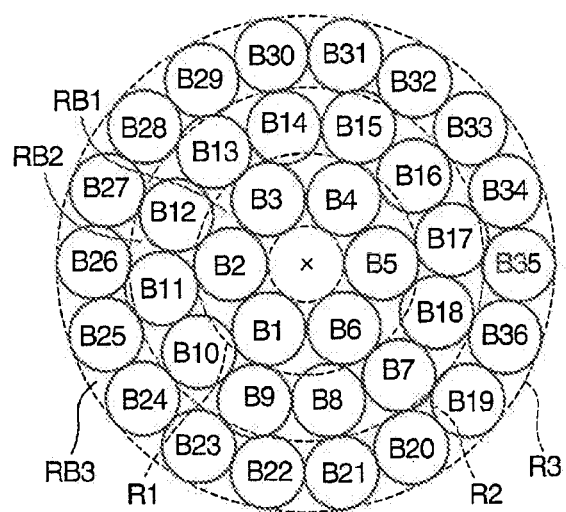

In the case of the reflecting surface 10 shown in FIG. 4a, the first, inner ring region RB1 is adjoined by a second, outer ring region RB2 in which twelve reflecting regions B7 to B18 that are also immediately adjacent to one another are disposed, so that the fill factor in the arrangement of the reflecting regions B1 to B18 is optimized. The same applies to the reflecting surface 10 shown in FIG. 4b, which has a third ring region RB3 in which a further eighteen reflecting regions B19 to B36 are arranged that are also immediately adjacent to one another. The three reflecting surfaces 10 shown in FIG. 3 and in FIGS. 4a, b have respectively a number of six, eighteen and thirty-six (circular) reflecting regions. With that number of reflecting regions, a (local) maximum of the fill factor occurs in each case.

So as to manage with as great as possible a beam parameter product or as low as possible a beam quality of the pump light beam 8, a diameter $D_{PUMP}$ of the pump light beam 8 emerging from the pump light source 7 is selected to be half as large as a diameter $D_{KOLL}$ of the collimated pump light beam 8.

In the following, three different possibilities with which the deflection between the eighteen reflecting regions B1 to B18 of the reflecting surface 10 of FIG. 4a can be implemented are described in connection with FIGS. 5a-c, with the reflecting regions B1 to B18 being numbered, unlike in FIG. 4a, according to the order in which the pump light beam 8 passes through them, so that the outer ring region RB2 has the reflecting regions B1 to B12 and the inner ring region RB1 has the reflecting regions B13 to B18.

Figure 5A:
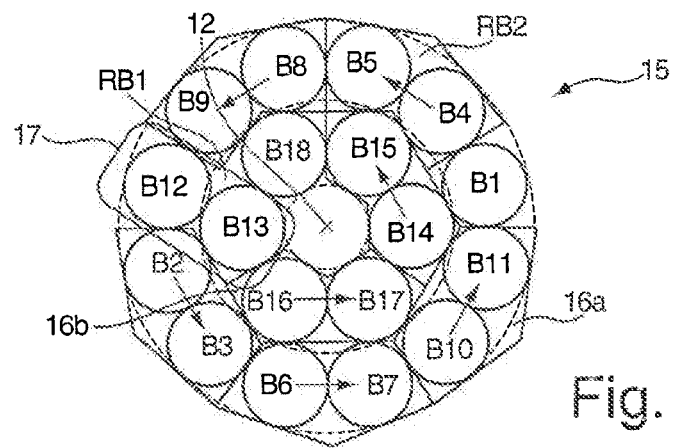
FIGS. 5a-c are illustrations of the reflecting surface of FIG. 4a with three differently configured deflecting assemblies for deflecting the pump light beam between the reflecting regions.

In the case of the variant shown in FIG. 5a, a deflecting assembly 15 of the pump light assembly 6 is illustrated in which two kinds of deflecting device 16a, 16b in the form of (bi)prisms are used: five biprisms 16a for azimuthal deflection between respectively adjacent reflecting regions B2 to B11 in the outer ring region RB2, and two biprisms 16b for azimuthal deflection between respectively adjacent reflecting regions B14 to 817 in the inner ring region RB1. In addition, a deflecting device 17 for radial deflection of the pump light beam 8 is provided which is formed, for example, by two deflecting mirrors having deflecting surfaces oriented at an angle of goo to each other (not shown in FIG. 5a) or by a biprism.

Figure 5B:
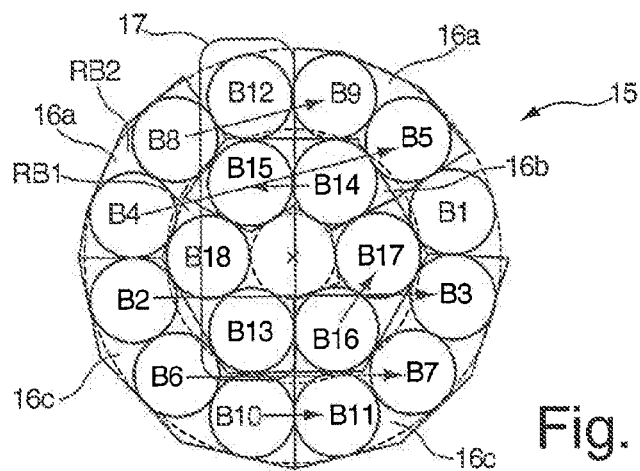

In the case of the variant shown in FIG. 5b, two deflecting devices 16c and 16a are formed, each of which has two prisms that are mirror-symmetrical with respect to a plane of symmetry. The first deflecting device 16c serves for deflection between in each case three reflecting surfaces of the outer ring region RB2. The second deflecting device 16a serves for deflection between in each case two reflecting surfaces of the outer ring region RB2. Two further deflecting devices 16b serve in the variant shown in FIG. 5a, for deflection between in each case two adjacent reflecting surfaces B15 to B17 of the inner ring region RB1. As in FIG. 5a, the deflecting device 17 in the form of two deflecting mirrors or surfaces oriented at 90° to each other serves for deflection between a reflecting region B12 of the outer ring region RB2 and a reflecting region B13 of the inner ring region RB1 which, in contrast to FIG. 5a, are not immediately adjacent to each other in the radial direction.

Figure 5C:
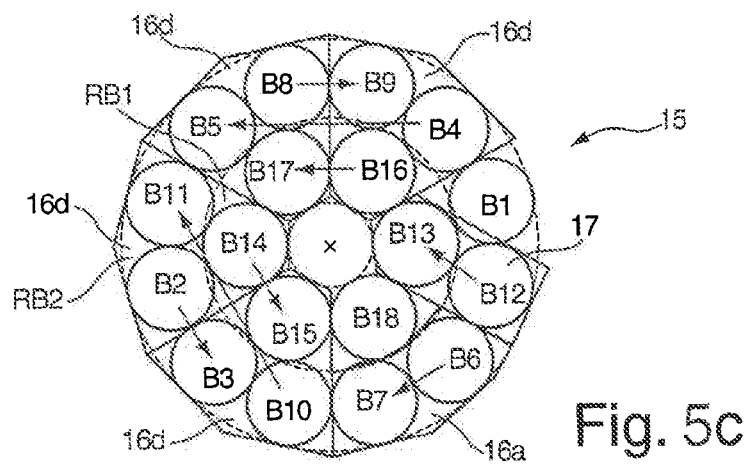

In the case of the variant illustrated in FIG. 5c, as in FIG. 5b, two deflecting devices 16d and 16a are used, each of which has two prisms that are mirror-symmetrical with respect to a plane of symmetry. The deflecting devices 16d serve for azimuthal deflection of the pump light beam 8 both between in each case two reflecting regions of the outer ring region RB1 and between in each case two adjacent reflecting regions of the inner ring region RB2. Here, two deflecting devices 16d cover a sector of 120° in each case.

In the remaining sector of 120°, a further deflecting device 16a in the form of a biprism is provided which serves for deflection of the pump light beam 8 between two adjacent reflecting regions B6, B7 of the outer ring region RB2. A further deflecting device 17, which serves for radial deflection between a reflecting region B12 of the outer ring region RB2 and a reflecting region B13 of the inner ring region RB1, is of a construction identical to that of the further deflecting device 16a and is also in the form of a biprism.

The deflecting assembly 15 illustrated in FIG. 5a has proved especially advantageous, since with it it is possible to avoid what are referred to as clipping effects (clipping losses). Those effects occur in the deflection of the pump radiation over the center when prisms forming deflecting devices for the reflecting regions B13 to B18 in the inner ring region RB1 are disposed closer to the parabolic mirror than are prisms serving as deflecting devices for the reflecting regions B1 to B12 in the outer ring region RB2.

Figure 6:
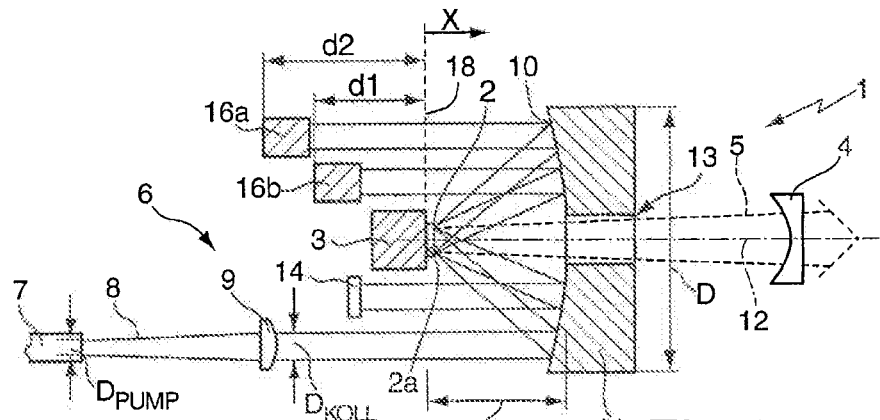
FIG. 6 is a schematic illustration of a disc laser according to the invention with a pump light assembly according to the invention.

FIG. 6 shows a disc laser 1 with a pump light assembly 6 in which deflecting devices 16a,16b of the type illustrated in FIG. 5a, that is, in the form of biprisms, are provided, illustrating for the sake of simplicity only one deflecting device 16a, 16b for each of the two ring regions RB2, RB1. The deflecting devices 16a, 16b are disposed in this case at a distance d2 and d1, respectively, from a focal plane 18 of the reflecting surface 10, which distance is defined in each case starting from a common base side of the deflecting devices 16a, 16b in the form of (bi)prisms.

The deflecting devices 16a, 16b are arranged in such a manner that the optical path length travelled by the pump light beam 8 in the deflection between in each case two of the reflecting regions B13 to B18 and B1 to B12 (see FIG. 5a) is larger than double the focal length 2 f of the concave mirror 11, since the optical path length is 2 f+2 d2 and 2 f+2 d1, respectively.

Since for a telecentric beam path the optical path length is 2 f in the imaging operation, in the case of the pump light assembly 6 shown in FIG. 6 a deviation is made from telecentric imaging, that is to say, the optical path length is larger than that in the case of telecentric imaging. The larger optical path length serves to compensate for or prevent a beam expansion of the pump light beam 8 in successive focusings onto the laser-active medium 2.

In order to achieve this, the deflecting devices 16a, 16b are disposed at different distances d2, d1 from the focal plane 18, with all deflecting devices 16a for azimuthal deflection of the pump light beam 8 between reflecting surfaces B1 to B12 in the outer ring region RB2 (cf. FIG. 5a) having the same distance d2 from the focal plane 18. Correspondingly, all deflecting devices 16b for azimuthal deflection of the pump light beam 8 between reflecting surfaces B13 to B18 in the inner ring region RB1 are disposed at the same (smaller) distance d1 from the focal plane 18.

This has proved advantageous for maximizing the power of the pump light beam 8 injected into the laser-active medium 2 in the case of a predefined number of passes, since that power is dependent on the respective distance d2, d1 of the deflecting devices 16a, 16b from the focal plane 18. That relationship will be explained in greater detail hereinafter with reference to the diagrams shown in FIGS. 8a-c which show the efficiency, that is, the (output) power P (in Watt) injected into the laser-active medium 2 at an input power of the pump light source 7 of 1 W as a function of the respective distance d1 and d2 (in mm), where a negative sign for the distance d1, d2 corresponds to a distance from the focal plane 11 in the negative X-direction (cf. FIG. 6) where the focal plane 18 has the coordinate x=0.

Figure 8A:
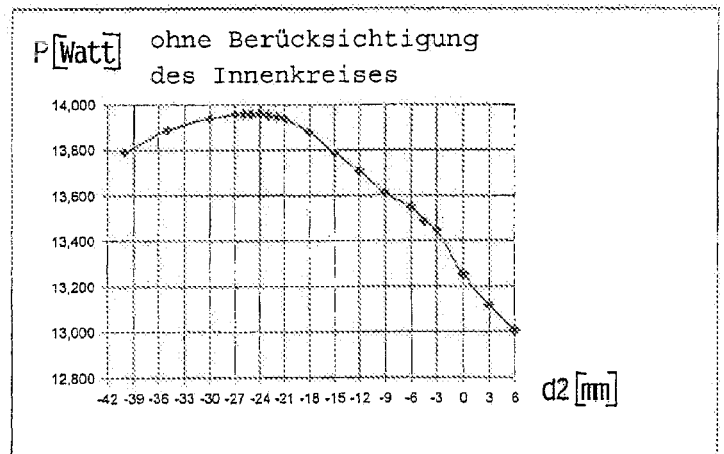
FIGS. 8a-c are diagrams of the pump power injected into a laser-active medium shown as a function of the distance of the deflecting devices from a focal plane containing the laser-active medium.
Figure 8B:
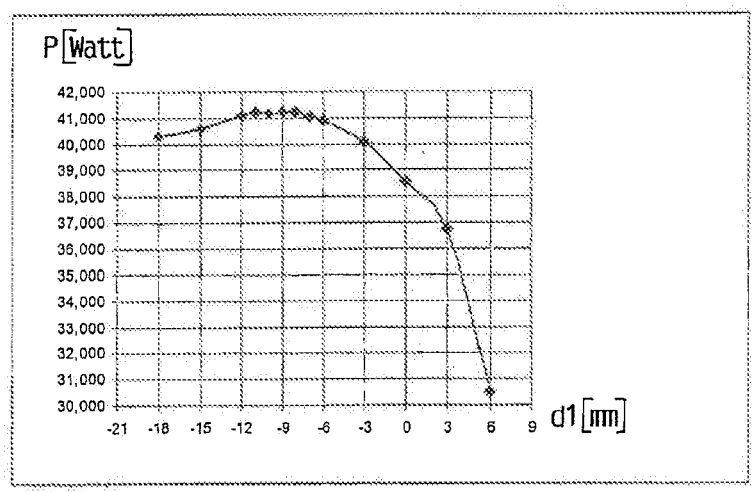
Figure 8C:
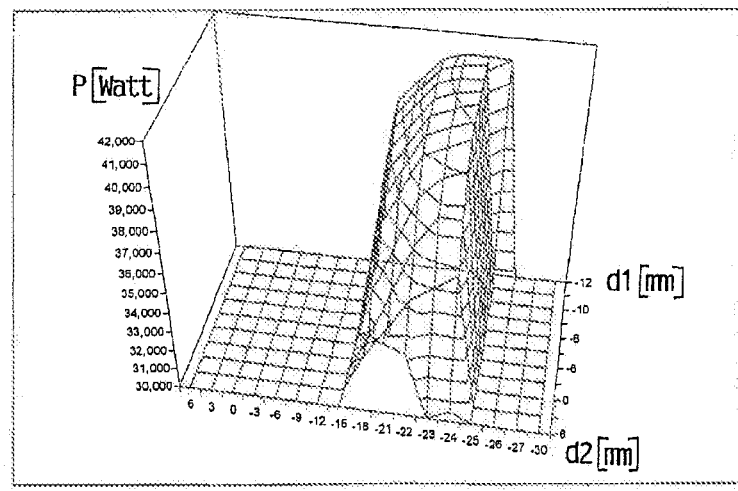

The diagrams shown in FIGS. 8a-c are based on simulation calculations in which a pump light assembly in the form of a 44-fold cavity with eight reflecting regions in an inner ring region and fourteen reflecting regions in an outer ring region has been simulated. In the diagram shown in FIG. 8a, the power P is shown as a function of the distance d2 when only the outer deflecting devices 16a are present, that is, without taking into consideration the inner deflecting devices 16b, and the end mirror 14 also not being taken into consideration.

In FIG. 8b, the entire deflecting assembly 15 with all deflecting devices 16a, 16b and with the end mirror 14 has been simulated, FIG. 8b showing the dependence of the power P or the efficiency on the distance d1 of the inner deflecting devices 16b from the focal plane 18 or the plane containing the laser-active medium 2. Finally, FIG. 8c shows the dependence of the power P on both distances d1, d2 in a three-dimensional view.

As will be apparent from FIGS. 8a-c, the range of maximum power P or efficiency in the simulation results shown is in a range of |d1|>8 mm and 25 mm>|d2|>15 mm. Suitable values for the distances d1, d2 depend, however, on the geometric circumstances, inter alia the focal length f (here: focal length f=80 mm) and the diameter D of the concave mirror 11 (or more accurately the diameter D of the reflecting surface 10 on which the reflecting regions are formed) (here: D=150 mm), so that the results described in FIGS. 8a-c (regarding the magnitude of the distances) cannot readily be generalized. It is, however, striking that the distances d1, d2 at which a maximum power is produced deviate significantly from the configuration in the case of telecentric imaging (i.e. d1=0, d2=0). It has proved advantageous if the additional optical path length in excess of that for telecentric imaging (i.e. 2 d1 and 2 d2, respectively) is at least a quarter of and preferably at least half of the focal length f of the parabolic mirror. As a rule, the additional optical path length is not greater than the focal length f of the parabolic mirror 11.

In the foregoing simulation calculations, the effect exerted by the static curvature (approx. 2.2 m) of the laser disc has been taken into consideration. Only the (dynamic) change in the curvature of the laser disc 2, which is caused in operation by thermal effects, has not been taken into consideration. Those thermal effects may lead to a change in the path length required for telecentric imaging, which can be additionally compensated for, for example in the manner described in the dissertation of S. Erhard mentioned in the introduction. The thermal refractive power change is, however, very slight (in the range of 0.04 dpt to about 0.1 dpt). The static refractive power of the disc, on the other hand, is in arrange of about 0.6 dpt to 0.9 dpt, whereas the refractive power of the parabolic mirror is about 25 dpt.

When a plurality of ring regions RB1-RBn are used, described below by way of example for two ring regions RB1, RB2, the problem arises in the deflecting device 17 (ct. FIG. 5a) used for deflecting the pump light beam 8 between a reflecting region B13 in the first ring region RB1 and a reflecting region B12 in the second ring region RB2 that the parabolically curved reflecting surface 10 does not image the laser-active medium 2, or rather the pump spot formed there, with maximum sharpness since, in order to do that, the so-called Scheimpflug condition would have to be fulfilled, that is, the image plane must be rotated so that the object (pump spot on the disc) can be imaged into itself again, which is not possible when using a deflecting device 17 having merely mirror surfaces or prism surfaces that are at an angle of 90° to each other and that have a plane of symmetry.

Figure 7A:
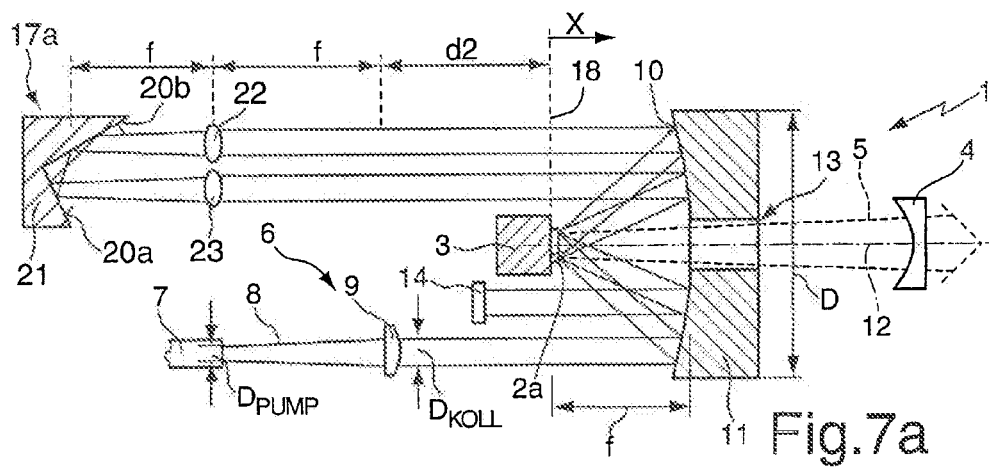
FIG. 7a is a schematic illustration of a deflecting device of imaging optics for meeting the Scheimpflug condition.

FIG. 7a shows a configuration of a deflecting device 17a which fulfills the Scheimpflug condition and in which the image plane is rotated when a parabolic mirror 11 is used. In order to be able to make that correction, the optical path length has to be extended (for example by 4 f) in order to produce an intermediate image plane. This is done in the configuration shown by introducing two collimating lenses 22, 23 into the beam path. For clarity of the drawing, only one bundle of rays has been shown in FIG. 7a. For that reason, the intermediate image plane produced is only a point. The deflecting device 17a also has a biprism 21 with two mirror surfaces 20a, 20b. The biprism 21 does not have a plane of symmetry and the angles formed between the mirror surfaces 20a. 20b and the beam axis (X-direction) and between themselves are adapted in such a manner that a sharp image is produced on the laser disc. The angle or angles for adaptation depend on the angle of incidence on the laser disc 2 of the pump radiation reflected by the parabolic mirror 11. With suitably selected angles, the deflecting device 17a effects the rotation of the image plane and the return to the same place in the deflection between the ring regions RB1, RB2.

In the case of the configuration shown in FIG. 7a, the deflection between the ring regions RB1, RB2 is telecentric and the deflection within a ring region RB1 or RB2 is not telecentric. For better clarity of the drawing, the deflecting units 16a and 16b for the deflection within the ring regions are not shown, their position being identical to that shown in FIG. 6. There is also the possibility, however, of configuring the deflection between the ring regions RB1, RB2 to be non-telecentric. The advantage of non-telecentric imaging has an impact above all, however, in the case of a multitude of passes, as occurs, for example, in the deflection within a respective ring region RB1 or RB2.

Figure 7B:
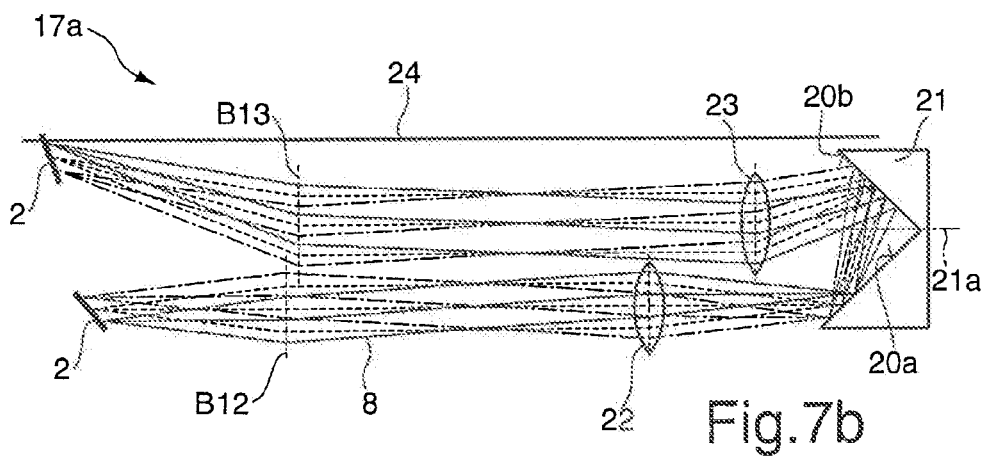
FIG. 7b is a simplified schematic illustration of a deflecting device to illustrate imaging optics for meeting the Scheimpflug condition.

FIG. 7b serves to illustrate the rotation of the image plane in order to fulfill the Scheimpflug condition when using a parabolic mirror 11. Here, a simplified illustration has been chosen in which the concave mirror 11 has been replaced by two lenses B12 and B13 which in reality correspond to reflecting regions on the concave mirror 11. This leads to the laser medium 2 in the illustration in FIG. 7b having two positions, but in reality (with concave mirror) it is located in one position on the side of the deflecting prisms as shown in FIG. 7a.

The deflecting device 17a has, as shown in FIG. 7a, two deflecting surfaces 20a, 20b oriented symmetrically with respect to a plane 21a which are formed on a biprism 21 and which are in contact with each other along a common base line. The deflecting device 17a further has imaging optics in the form of two lenses 22, 23 which serve to extend the optical path length so that the correction for the Scheimpflug condition can be made.

The laser-active medium 2 shown on the right at the bottom of FIG. 7b, which is disposed at an angle to an optical axis 24 of the imaging optics 22, 23, is deflected (here transmitted) and at the same time collimated at a first reflecting region B12 of the concave mirror 11, which for simplicity is shown as a lens. The collimated pump light beam 8 is imaged by the first lens 22 onto the first deflecting surface 20a, which serves here as an image plane. The latter is tilted with the aid of the second deflecting surface 20b and is then imaged at a different angle by means of the second lens 23 so that, after reflection at an (inner) reflecting surface B13 of the concave mirror 11, an image of the laser-active medium 2 is produced at a different location and with a different image position and the Scheimpflug condition is met.

As already described in the foregoing, for deflection between the ring regions RB1, RB2 the deflecting device 17a may alternatively be configured in such a way that, rather than a telecentric image being produced as described in connection with FIG. 7a,b, an expansion of the pump light radiation is prevented by selecting non-telecentric imaging.

In the case of the deflecting assemblies 15 described above, a deflection between the different ring regions RB1, RB2 is carried out only once in each case. It will be appreciated, however, that a radial deflection of the pump light beam 8 between the ring regions RB1, RB2 may, where applicable, be carried out repeatedly, in which case non-telecentric imaging is advantageous for preventing expansion of the pump light radiation. In addition, in the case of the deflecting assemblies 15 described above, the coupling in of the collimated pump light beam 8 of the pump light source 7 takes place in each case in the outer ring region RB2 and the coupling out or back-reflection takes place in the inner ring region RB1. It will be appreciated, however, that the reverse case is equally possible, that is, coupling in in the inner ring region RB1 and back-reflection in the outer ring region RB2. Alternatively, both coupling in and coupling out may take place in one and the same ring region RB1 or RB2.

It will further be appreciated that the deflecting assembly 15 has been described in connection with two ring regions RB1, RB2 purely for the sake of simplicity and that a suitably adapted deflecting assembly 15 is equally possible when using a reflection surface 10 with three (cf. FIG. 4b) or more ring regions.

What is claimed is:

1. A pump light assembly for a disc laser, comprising:
   a focusing device, in particular a concave mirror, having a reflecting surface for focusing a pump light beam onto a laser-active medium, and
   a deflecting assembly for deflecting the pump light beam between reflecting regions (B1 to B12) formed on the reflecting surface and disposed in different angular regions about a central axis of the reflecting surface,
   wherein the deflecting device is configured to produce a deflection of the pump light beam between in each case two of the reflecting regions (B1 to B12) with an optical path length (2f+2 d1; 2f+2 d2) that is greater than the optical path length (2f) in the case of telecentric imaging in order to compensate for a beam expansion of the pump light beam, caused by aberrations of the focusing device, in successive focusings onto the laser-active medium and
   wherein the additional optical path length (2 d1; 2 d2) in excess of the optical path length (2 f) in the case of telecentric imaging is at least a quarter of the focal length (f) of the focusing device.

2. A pump light assembly according to claim 1, wherein the deflecting assembly is configured for deflection of the pump light beam between reflecting regions (B1 to B12; B13 to B18) disposed at different distances from the central axis of the reflecting surface.

3. A pump light assembly according to claim 1, wherein the optical path length (2f+2 d1; 2f+2 d2) of the pump light beam in the deflection between in each case two of the reflecting regions (B1 to B12, B13 to B18) is selected in such a manner that the power of the pump light beam injected into the laser-active medium is maximized.

4. A pump light assembly according to claim 1 in which the deflecting assembly is configured for deflection of the pump light beam between in each case two of the reflecting regions (B1 to B12; B13 to B18) disposed at the same distance from the central axis of the reflecting surface with the same optical path length (2f+2 d1; 2f+2 d2).

5. A pump light assembly according to claim 1, in which the reflecting regions (B13 to B18; B1 to B12) are disposed in a first, inner ring region (RB1) and in a second, outer ring region (RB2) of the reflecting surface.

6. A pump light assembly according to claim 5, in which the optical path length (2 f+2 d1) of the pump light beam in the deflection between two reflecting regions (B13 to B18) in the first, inner ring region (R81) is less than the optical path length (2 f+2 d2) in the deflection of the pump light beam between two reflecting regions (B1 to B12) in the second, outer ring region (RB2).

7. A pump light assembly according to claim 5, in which the deflecting assembly has a deflecting device for deflection of the pump light beam between a reflecting region (B13) in the first ring region (RB1) and a reflecting region (B12) in the second ring region (RB2), the deflecting device having two mirror surfaces and imaging optics which are configured for meeting the Scheimpflug condition in the imaging of the pump light beam at the reflecting regions (B13, B12) by the two focusing operations associated with the deflection.

8. A pump light assembly according to claim 1, in which the first ring region (RB1) has a number of six reflecting regions (B13 to B18).

9. A pump light assembly according to claim 5, in which the second ring region (RB2) has a number of twelve reflecting regions (B1 to B12).

10. A pump light assembly according to claim 5, in which the reflecting surface has a third, radially outer ring region (RB3) which preferably comprises a number of eighteen reflecting regions (B19 to B36).

11. A pump light assembly according to claim 1, in which the reflecting surface has an aspherical shape, in particular a parabolic shape.

12. A pump light assembly according to claim 1, in which the deflecting assembly has at least one deflecting device with two deflecting surfaces oriented mirror-symmetrically with respect to a plane of symmetry which are preferably formed on one or more prisms.

13. A pump light assembly according to claim 5, in which the deflecting assembly has a deflecting device for deflection of the pump light beam in the azimuthal direction between the reflecting regions (B13 to B18) of the first ring region (RB1) and/or the reflecting regions (B1 to B12) of the second ring region (RB2).

14. A pump light assembly according to claim 1, further comprising a pump light source for generating the pump light beam.

15. A pump light assembly according to claim 14, further comprising a collimation optics arranged in the beam path between the pump light source and the reflecting surface for collimation of the pump light beam.

16. A pump light assembly according to claim 15, in which a diameter ($D_{Pump}$) of the pump light beam emerging from the pump light source is half as great as a diameter ($D_{koll}$) of the collimated pump light beam.

17. A disc laser, comprising a laser-active medium, and a pump light assembly according to claim 1.

18. A method for pumping a laser-active medium, comprising:
repeatedly focusing a pump light beam onto the laser-active medium by means of a focusing device, especially a concave mirror, wherein between successive focusing steps a deflection of the pump light beam between different reflecting regions (B1 to B12) of a reflecting surface of the focusing device which are disposed in different angular regions about a central axis of the reflecting surface is taking place,
wherein the deflection of the pump light beam between in each case two of the reflecting regions (B1 to B12, B13 to B18) takes place with an optical path length (2f+2d1; 2f+2 d2) that is greater than the optical path length (2 f) in the case of telecentric imaging in order to compensate for a beam expansion of the pump light beam, caused by aberrations of the focusing device, in the focusing onto the laser-active medium, and
wherein the additional optical path length (2 d1; 2 d2) in excess of the optical path (2 f) in the case of telecentric imaging is at least a quarter of the focal length (f) of the focusing device.

19. A method according to claim 18, in which a deflection of the pump light beam additionally takes place between reflecting regions (B1 to B12, B13 to B18) disposed at different distances from the central axis of the reflecting surface.

20. A method according to claim 19, in which the optical path length (2f+2 d1; 2f+2 d2) of the pump light beam in the deflection between in each case two of the reflecting regions (B1 to B12, B13 to B18) is selected in such a manner that the power of the pump light beam injected into the laser-active medium is maximized.

21. A pump light assembly according to claim 1, wherein the additional optical path length (2 d1; 2 d2) is at least half of the focal length (f) of the focusing device.

22. A method according to claim 18, wherein the additional optical path length (2 d1; 2 d2) is at least half of the focal length (f) of the focusing device.

* * * * *